W. N. BOYLES.
PIE LIFTER.
APPLICATION FILED JUNE 11, 1913.
1,099,279.
Patented June 9, 1914.
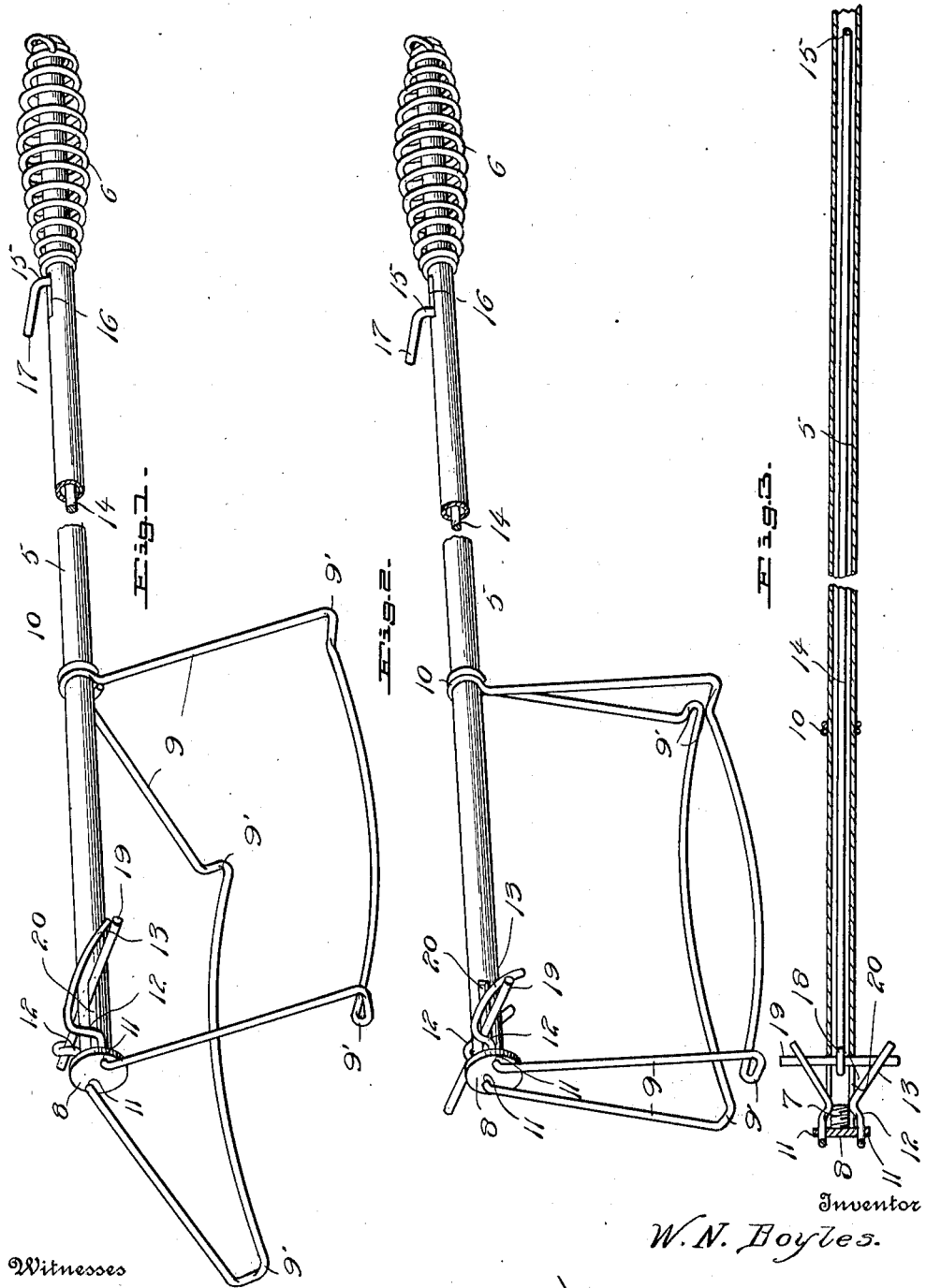
Inventor
W. N. Boyles.

UNITED STATES PATENT OFFICE.

WILLIAM N. BOYLES, OF NORTH BEND, OREGON.

PIE-LIFTER.

1,099,279.  Specification of Letters Patent.  Patented June 9, 1914.

Application filed June 11, 1913. Serial No. 773,118.

*To all whom it may concern:*

Be it known that I, WILLIAM N. BOYLES, a citizen of the United States, residing at North Bend, in the county of Coos, State of Oregon, have invented certain new and useful Improvements in Pie-Lifters; and I do hereby declare the following to be a full, clear, and exact description of the invention, such as will enable others skilled in the art to which it appertains to make and use the same.

This invention relates to new and useful improvements in plate or pan lifters.

The object of the present invention resides in the provision of a plate or pan lifter provided with means for holding the device in open position whereby it may readily be engaged with a plate or pan to lift the same.

A further object resides in simplifying the structure and improving the general efficiency of a device of this character.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a perspective view of the device held in open position, Fig. 2 is a similar view, but showing the device in closed position, and Fig. 3 is a horizontal longitudinal sectional view taken through the device when it is in the position as shown in Fig. 1.

Referring now more particularly to the drawings, wherein is shown the preferred form of the invention, 5 designates the hollow body portion of the device which is provided at one end with the suitable hand grip 6 forming a handle therefor. The other end of the device is slotted and provided with threads for engaging a threaded boss 7 on the head 8. The pan engaging members comprise each a single strip of metal 9 bent in U-shape and provided at the ends of their bight portions with suitable curvatures 9' to facilitate holding the pan. The inner arms of these members terminate in eye portions 10 which are rotatably disposed on the hollow body member. The free ends of the other arms are directed inwardly through openings 11 formed in the head and are then directed upwardly as at 12 and terminate in downwardly and laterally directed extensions 13. The means for actuating these pan engaging members to open position comprises a rod 14 slidable in the hollow body portion and terminating at its inner end in a finger 15 extending slidably through a slot 16 formed in the body portion adjacent the handle. This finger preferably directed laterally at its free end as at 17 to provide a means for actuating the rod 14 with the thumb of the operator. The other end of the rod 14 is provided with an eye 18 in which is fixedly secured a rod 19 extending outwardly on each side of the body portion and slidable in the slots 20 provided in the body portion adjacent the head. It is observed that the laterally and downwardly directed extensions of the pan engaging members are disposed transversely of the plane of movement of the rod 19. When the rod is moved to engage these extensions the said extensions will ride outwardly on the rod and cause the pan engaging members to swing pivotally outwardly with relation to the body portion of the device. The upwardly directed portions 12 of the arms of the pan engaging members serve as stops to prevent undue outward swinging movement of said members, by engaging with the upper portion of the wall of the body member.

From the foregoing it is observed that to swing the pan engaging members outwardly to open position so that the device may be readily associated in operative relation with the pan it is only necessary for the operator to pull the finger 17 toward the handle with his thumb.

What is claimed is:

1. A lifter of the class described comprising a hollow body portion, provided with alined longitudinal slots at its outer end, pan engaging members pivotally connected to the outer portion of the body, arms carried by said members and extending downwardly and outwardly across the plane of the slots, a rod slidable in the body portion provided at its outer end with lateral extensions slidable in the slots and adapted to engage the said arms, and means for actuating the said rod.

2. A lifter of the class described comprising a hollow body portion, the outer end of the body portion being provided with longitudinal alined slots, a rod slidable in the body portion, a rod secured transversely to the outer end of the first rod and extending through and slidable in the slots, the other end of the body portion being slotted, an actuating finger on the other end of the first rod extending through the slot, a head on the outer end of the body portion, and pan engaging members each comprising a U-shaped length of wire formed at one end with an eye rotatable on the body portion, the other end being directed inwardly and passed through the head, then directed upwardly and terminating in a downwardly and outwardly directed extension crossing the plane of movement of the transverse rod.

In testimony whereof, I affix my signature, in the presence of two witnesses.

WILLIAM N. BOYLES.

Witnesses:
N. C. McLeod,
M. E. Everitt.